(12) United States Patent
Huang et al.

(10) Patent No.: US 11,409,880 B2
(45) Date of Patent: Aug. 9, 2022

(54) BLACKBOX SECURITY FOR CONTAINERS

(71) Applicant: International Business Machines Corporation, Armonk, NY (US)

(72) Inventors: Hai Huang, Scarsdale, NY (US); Jia Jun Brandon Lum, White Plains, NY (US); Sahil Suneja, Ossining, NY (US); Ricardo Andrei Koller Jemio, White Plains, NY (US); Malgorzata Steinder, Leonia, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 550 days.

(21) Appl. No.: 16/509,137

(22) Filed: Jul. 11, 2019

(65) Prior Publication Data
US 2021/0012011 A1      Jan. 14, 2021

(51) Int. Cl.
*G06F 21/75*    (2013.01)
*G06F 21/57*    (2013.01)

(52) U.S. Cl.
CPC .... *G06F 21/575* (2013.01); *G06F 2221/2115* (2013.01)

(58) Field of Classification Search
CPC .................. G06F 21/575; G06F 2221/2115
See application file for complete search history.

(56) References Cited

U.S. PATENT DOCUMENTS

| | | | |
|---|---|---|---|
| 9,703,965 B1 | 7/2017 | Robinson et al. | |
| 9,858,428 B2 | 1/2018 | Barton et al. | |
| 10,001,990 B2 | 6/2018 | Branca | |
| 10,114,947 B1 | 10/2018 | Benameur et al. | |
| 2009/0323941 A1 | 12/2009 | Sahita et al. | |
| 2014/0047535 A1 | 2/2014 | Parla et al. | |
| 2016/0219073 A1 | 7/2016 | Mathur et al. | |
| 2016/0292431 A1 | 10/2016 | Sreekanti et al. | |

(Continued)

OTHER PUBLICATIONS

International Search Report and Written Opinion received for PCT Application Serial No. PCT/EP2020/068570 dated Sep. 11, 2020, 12 pages.

(Continued)

*Primary Examiner* — Zahid Choudhury
(74) *Attorney, Agent, or Firm* — Amin, Turocy & Watson, LLP

(57) ABSTRACT

Techniques facilitating security hardening systems that host containers are provided. In one example, a system comprises: a memory that stores computer executable components; and a processor that executes computer executable components stored in the memory. The computer executable components comprise: a boot component performs a portion of a trusted boot sequence to securely boot the system to a defined secure state wherein one or more types of administrative access to a container memory are deactivated. The computer executable components also comprise: a core service component started as a part of the trusted boot sequence and that securely obtains one or more decryption keys for use with the container memory; and a runtime decryption component that uses the one or more decryption keys to perform runtime decryption of one or more files accessed by a container associated with the container memory.

25 Claims, 10 Drawing Sheets

(56) References Cited

U.S. PATENT DOCUMENTS

| | | | |
|---|---|---|---|
| 2018/0007051 A1* | 1/2018 | Vij | G06F 21/6245 |
| 2018/0121189 A1 | 5/2018 | Philippov et al. | |
| 2018/0247064 A1 | 8/2018 | Aronovich et al. | |
| 2018/0260578 A1 | 9/2018 | Orloff | |
| 2018/0285139 A1 | 10/2018 | Shapira et al. | |
| 2018/0294962 A1 | 10/2018 | Kraemer et al. | |
| 2018/0309747 A1 | 10/2018 | Sweet et al. | |
| 2019/0005244 A1* | 1/2019 | Brasher | G06F 12/145 |
| 2019/0042759 A1* | 2/2019 | Smith | G06F 21/74 |
| 2021/0406201 A1* | 12/2021 | Rozas | G06F 21/53 |

OTHER PUBLICATIONS

Jain, "Containers, Dockers, and Kubernetes", Washington University, http://www.cse.wustl.edu/~jain/cse570-18/, 2018, 31 pages.

Yeluri et al., "Trusted Docker Containers and Trusted VMs in OpenStack", Intel Corporation, May 21, 2015, 16 pages.

Mattetti et al., "Automatic security hardening and protection of linux containers", IBM Research, Sep. 2015, 15 pages.

Arnautov et al., "SCONE: Secure Linux Containers with Intel SGX", Proceedings of the 12th USENIX Symposium on Operating Systems Design and Implementation (OSDI '16), Nov. 2-4, 2016, 17 pages.

"Proposal: New Mediatype—Container Image Encryption", https://github.com/opencontainers/image-spec/issues/747, last accessed on May 16, 2019, 19 pages.

"Intel® Software Guard Extensions", https://software.intel.com/en-us/sgx, last accessed on May 16, 2019, 5 pages.

Patel, "Intel Releases New Technology Specification for Memory Encryption", https://software.intel.com/en-us/blogs/2017/12/22/intel-releases-new-technology-specification-for-memory-encryption, Dec. 22, 2017, 3 pages.

"AMD Secure Encrypted Virtualization (SEV)", https://developer.amd.com/sev/, last accessed on May 16, 2016, 4 pages.

Hunt et al., "Supporting protected computing on IBM Power Architecture", https://developer.ibm.com/articles/l-support-protected-computing/, Mar. 22, 2018, 13 pages.

"Dm-crypt", https://wiki.archlinux.org/index.php/dm-crypt, last accessed on May 16, 2019, 2 pages.

Mell et al., "The NIST Definition of Cloud Computing", National Institute of Standards and Technology, Special Publication 800-145, Sep. 2011, 7 pages.

* cited by examiner

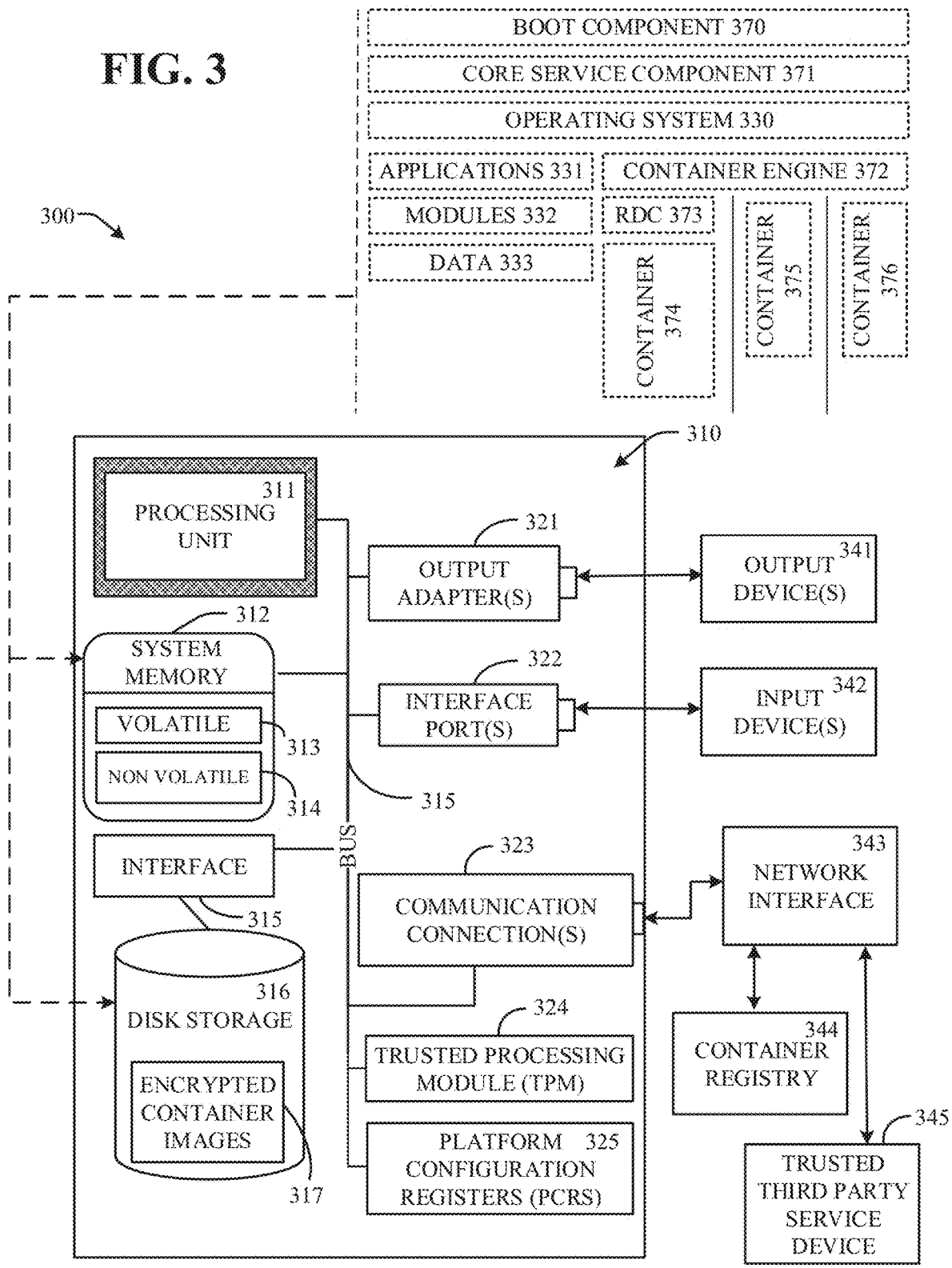

BLACKBOX SECURITY FOR CONTAINERS

BACKGROUND

The subject disclosure relates to operating system level virtualization technologies, wherein an operating system kernel supports multiple isolated user-space instances, known as containers.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate security hardening of containers are described.

According to an embodiment, a system can comprise a memory that stores computer executable components; and a processor that executes computer executable components stored in the memory. The computer executable components can comprise a boot component that performs at least a portion of a trusted boot sequence to securely boot the system to a defined secure state wherein one or more types of administrative access to a container memory are deactivated. A core service component started as a part of the trusted boot sequence can securely obtain one or more decryption keys for use with the container memory. A runtime decryption component can use the one or more decryption keys to perform runtime decryption of one or more files accessed by a container associated with the container memory.

According to an embodiment, a computer-implemented method can comprise performing, by a boot component operatively coupled to a processor, at least a portion of a trusted boot sequence to securely boot a computing system to a defined secure state wherein one or more types of administrative access to a container memory are deactivated. The boot component can start, as part of the trusted boot sequence, a core service component operatively coupled to the processor. The computer-implemented method can also comprise securely obtaining, by the core service component, one or more decryption keys for use with the container memory, and using, by a runtime decryption component operatively coupled to the processor, the one or more decryption keys to perform runtime decryption of one or more files accessed by a container associated with the container memory.

According to another embodiment, a computer program product facilitating container security can comprise a computer readable storage medium having program instructions embodied therewith. The program instructions can be executable by a processing component and cause the processing component to: perform at least a portion of a trusted boot sequence to securely boot a computing system to a defined secure state wherein one or more types of administrative access to a container memory are deactivated; and start, as part of the trusted boot sequence, a core service. The program instructions can also be executable to: securely obtain, by the core service, one or more decryption keys for use with the container memory, and use, by the processing component, the one or more decryption keys to perform runtime decryption of one or more files accessed by a container associated with the container memory.

According to a further embodiment, a computer-implemented method can comprise: instantiating, by a system operatively coupled to a processor, one or more containers by a docker component operatively coupled to a processor; and for at least one of the one or more containers, managing, by the system, one or more file accesses by the at least one of the one or more containers, wherein the runtime decryption component passes through one or more requests to access non-encrypted files, and wherein the runtime decryption component checks process identifiers (PIDs) of one or more processes requesting access to encrypted files to ensure the PIDs belong to an entrypoint process of the at least one of the one or more containers or a descendant process of the entrypoint process.

According to yet another embodiment, a computer-implemented method can comprise performing, by a boot component operatively coupled to a processor, at least a portion of a trusted boot sequence to securely boot a computing system, wherein the trusted boot sequence comprises: resetting one or more Trusted Processing Module (TPM) Platform Configuration Registers (PCRs), and running a series of boot components, wherein each boot component in the series measures a next boot component in the series and stores a corresponding PCR value. At least one of the boot components in the series of boot components can comprise a core service component. The computer-implemented method can also comprise performing, by the core service component operatively coupled to the processor, a TPM remote attestation to a trusted third party service device, and securely obtaining, by the core service component, one or more decryption keys for a container from the trusted third party service device, and storing the one or more decryption keys for the container in a container memory associated with the container.

DESCRIPTION OF THE DRAWINGS

FIG. 3 illustrates a block diagram of an example, non-limiting computing environment in accordance with one or more embodiments described herein.

DETAILED DESCRIPTION

Figure 1:
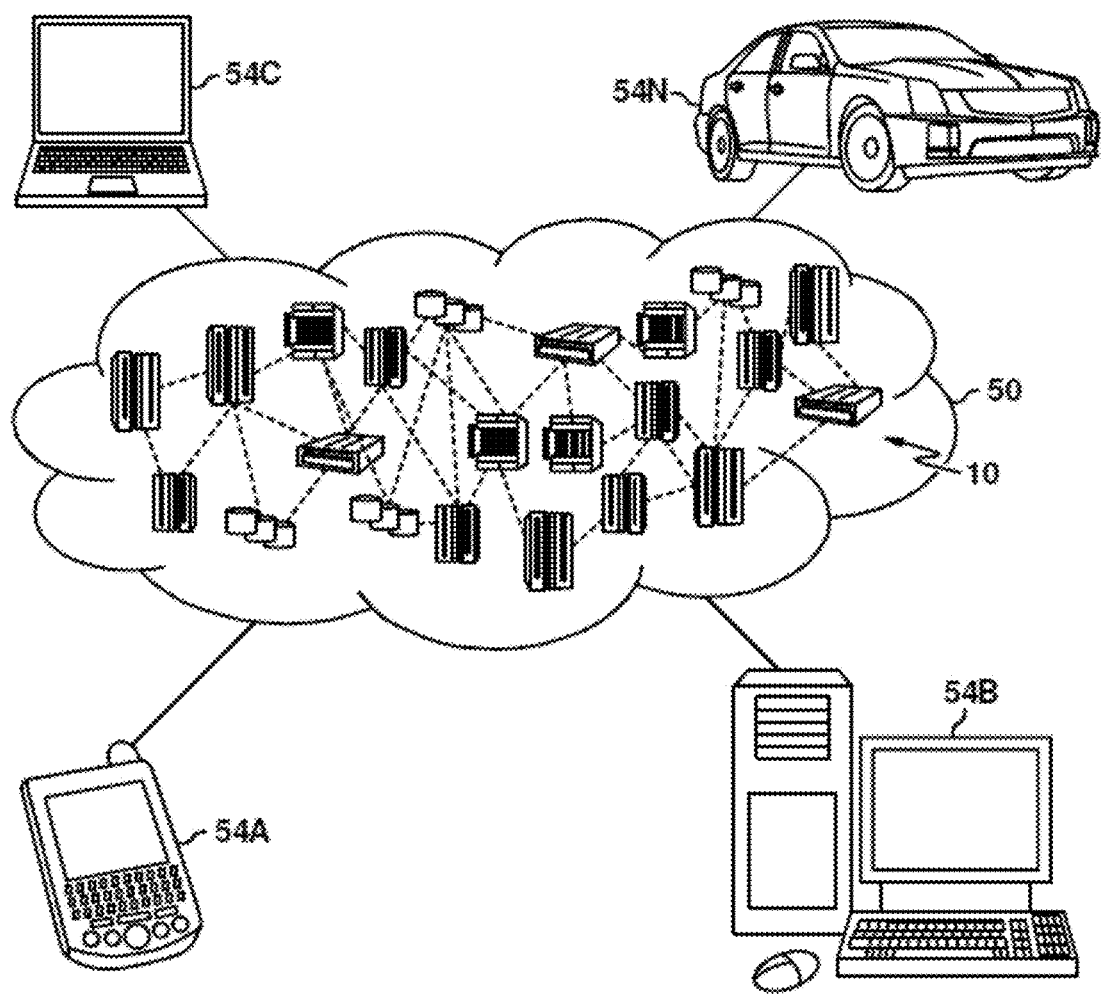
FIG. 1 illustrates a cloud computing environment in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

The use of "container" technology has gained traction in cloud computing environments, in large part because containers have many of the benefits of virtual machines, such as reduced physical infrastructure costs and better scalability and flexibility, without operating system multiplication and correspondingly higher resource overhead associated with virtual machines. This specification uses the term "container" to describe an aspect of the technology herein, however it will be appreciated that other terms for containers are known in the industry. For example, containers are sometimes referred to as Open Container Initiative (OCI) containers, Kubernetes containers, Windows Server Containers, Hyper-V containers, Intel Clear Containers or Kata containers. Container technologies generally allow portable containers to run on one or more virtual machines or other operating systems. The containers are isolated and so cannot interfere with each other, and cannot access each other's resources without permission. The term "container" as used herein is not limited to any particular type of container.

This specification uses the term "container engine" to describe another aspect of the technology herein, however it will be appreciated that other terms for container engines are known in the industry. Container engines generally provide runtime environments for containers which isolate the containers. "Dockers" are an example widely used container engine. Container engines can generally include, inter alia, a container daemon which provides an Application Programming Interface (API) and other features for use by containers. Container engines can furthermore include execution logic responsible for starting, stopping, pausing, unpausing, and deleting containers. The term "container engine" as used herein is not limited to any particular type of container engine.

Containers are generally transmitted and stored as "container images," which can be stored in local or networked container registries. Container images can be tagged with any desired information. In some cases, a container image can be identified by its 256 bit hash.

In some instances, containers can cooperate in a "swarm" of multiple cooperating containers. A swarm is a group of multiple cooperating containers. The swarm can include containers at each of a group of nodes collaborating over a network. A service can run on a swarm rather than a single container. Each swarm has managers that dispatch tasks to workers, and the managers can also serve as workers. The managers can select a leader which assigns tasks and re-assigns failed worker's tasks. Managers other than the leader can stand ready to elect a new leader if the previously selected leader fails. Using a swarm, services which employ containers can be scaled up and down as needed.

Containers employ a variety of security features. In general, container technologies provide container isolation so containers cannot interfere with each other, and cannot access each other's resources without permission. Furthermore, container images, or portions thereof, can be encrypted to protect container code and data while the container image is in storage in registries, or while the container image is being transmitted. However, once container images are downloaded to hosts with encryption keys, all container image content can be decrypted in plaintext and is susceptible to horizontal attacks and snooping of rogue administrators, that is, the root users of operating systems that run containers. Aspects of this disclosure provide security hardening measures which protect against such administrative access, thereby improving security of containers.

Containers are often hosted on servers in cloud computing environments. It is to be understood that although this disclosure includes a detailed description of cloud computing embodiments, implementation of the teachings recited herein are not limited to cloud computing environments. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer MB, laptop computer MC, and/or automobile computer system MN can communicate. Cloud computing nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
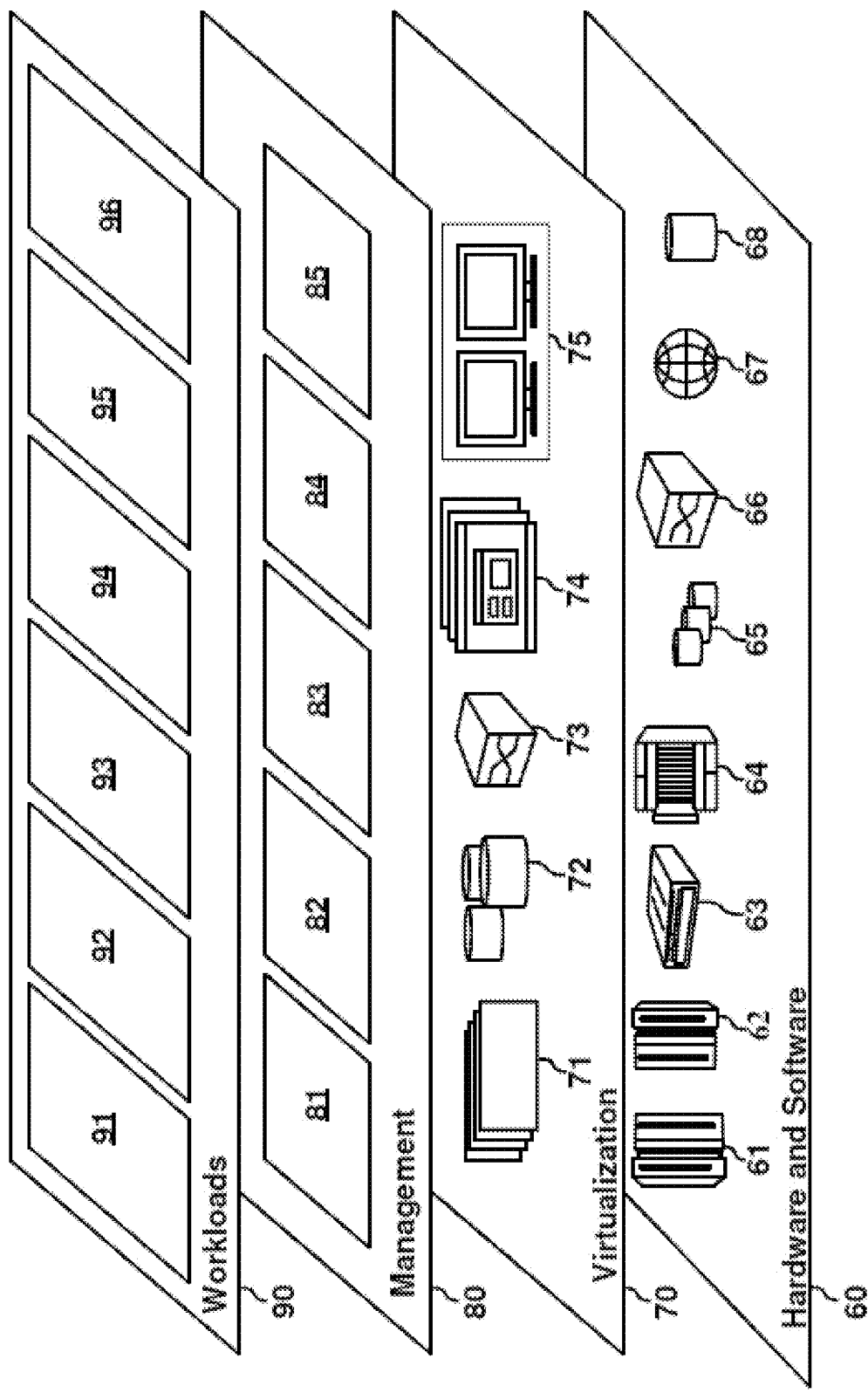
FIG. 2 illustrates abstraction model layers in accordance with one or more embodiments described herein.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions 81-84 described below. Functions 81-84 can include, for example, resource provisioning which provides dynamic procurement of computing resources and other resources that are utilized to perform tasks within the cloud computing environment. Metering and Pricing can provide cost tracking as resources are utilized within the cloud computing environment, and billing or invoicing for consumption of these resources. In one example, these resources can include application software licenses. Security provides identity verification for cloud consumers and tasks, as well as protection for data and other resources. A user portal can provide access to the cloud computing environment for consumers and system administrators. Service level management can provide cloud computing resource allocation and management such that required service levels are met. Service Level Agreement (SLA) planning and fulfillment can provide pre-arrangement for, and procurement of, cloud computing resources for which a future requirement is anticipated in accordance with an SLA. Furthermore, function 85 can provide a container engine which manages containers that execute in the workload layer 90.

Workload layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and containers 96. Workload layer 90 can optionally host many containers 96, which can be managed by the container engine provided by function 85. Each container of containers 96 can include container code and data.

FIG. 3 illustrates a block diagram of an example, non-limiting computing environment in accordance with one or more embodiments described herein. Various aspects of the computing environment are hardware components while other aspects are software components. With reference to FIG. 3, a suitable operating environment 300 for implementing various aspects of this disclosure can include a computer 310. Computer 310 can comprise, e.g. a cloud computing node such as one of the cloud computing nodes 10 illustrated in FIG. 1. As such, computer 310 can participate in the cloud computing environment 50 illustrated in FIG. 1. In other embodiments, the computer 310 can implement aspects of this disclosure without participating in the cloud computing environment illustrated in FIG. 1 and FIG. 2, as will be appreciated.

The computer 310 can include a processing unit 311, a system memory 312, and a system bus 315. The system bus 315 couples system components, including but not limited to the system memory 312, to the processing unit 311. The processing unit 311 can be any of various available processors. Dual microprocessors and other multiprocessor architectures also can be employed as the processing unit 311. The system bus 315 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 312 can also include volatile memory 313 and nonvolatile memory 314. The basic input/output system (BIOS), containing the basic routines to transfer information between elements within the computer 310, such as during start-up, is stored in nonvolatile memory 314. By way of illustration, and not limitation, nonvolatile memory 314 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 313 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 310 can also include removable/non-removable, volatile/nonvolatile computer storage media. FIG. 3 illustrates, for example, a disk storage 316. Disk storage 316 can also include, but is not limited to, devices like a magnetic disk drive, floppy disk drive, tape drive, Jaz drive, Zip drive, LS-100 drive, flash memory card, or memory stick. The disk storage 316 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 316 to the system bus 315, a removable or non-removable interface is typically used, such as interface 315.

In some embodiments, encrypted container images 317 can be retrieved by computer 310 from container registry 344 and stored in disk storage 316. Because the encrypted container images 317 are transferred to computer 310, and stored in disk storage 316 in encrypted format, there is little risk of a rogue administrator of computer 310 accessing the content of encrypted container images 317. It should also be noted that encrypted container images 317 can be stored in the system memory 312 instead of, or in addition to, being stored in disk storage 316.

FIG. 3 also depicts software that acts as an intermediary between users, applications, and containers, on one hand, and the computer 310 resources on the other. Such software can include, for example, an operating system 330. Operating system 330, which can be stored on disk storage 316, acts to control and allocate resources of the computer 310. In some embodiments, operating system 330 can be a virtual machine (VM), and the computer 310 can host multiple VMs. It is to be appreciated that this disclosure can be implemented with various operating systems or combinations of operating systems.

One or more boot components, such as boot component 370, can be involved in booting the operating system 330. Boot component 370 can interact with a Trusted Processing Module (TPM) 324 to securely boot the operating system 330. In general, the TPM 324 securely stores hashes of trusted boot components in platform configuration registers (PCRs) 325. Each boot component performs a hash of a next boot component in a trusted boot sequence, and uses TPM 324 to check the measured hash against the corresponding hash in PCRs 325. A next boot component in a trusted boot sequence is loaded only if its hash is correct, thereby ensuring the boot component is trusted, and resulting in the computer 310 booting to a verifiably secure state.

A boot component 370 can place requirements on the secure state of computer 310. For example, a boot component 370 can restrict or block certain operating system 330 functions. As will be described further herein, boot component 370 can, for example, deactivate one or more types of administrative access to a container memory, e.g., a portion of system memory 312 reserved for a container such as container 374.

Furthermore, boot component 370 can ensure that a trusted core service component 371 is loaded as part of a trusted boot sequence. Core service component 371 can be responsible for securely obtaining decryption keys to decrypt encrypted container images 317, or portions thereof. In some embodiments, core service component 371 can make use of TPM 324, introduced above, to securely obtain decryption keys. Core service component 371 can employ a TPM 324 remote attestation to trusted third party service device 345, to obtain decryption keys.

System applications 331 can take advantage of the management of resources by operating system 330 through program modules 332 and program data 333, e.g., stored either in system memory 312 or on disk storage 316. Similarly, container engine 372 can run on operating system 330. Container engine 372 can, for example, load, start and/or stop containers such as 374, 375 and 376. Container engine 372 can isolate containers 374, 375 and 376 so containers 374, 375 and 376 cannot interfere with one another or access each other's data. As described further herein, container engine 372 can optionally provide further container security with runtime decryption component (RDC) 373, which can manage encrypted file accesses by container 374. Runtime decryption component 373 can make use of the decryption keys securely obtained by trusted core service component 371.

Embodiments of this disclosure can prevent unwanted administrator snooping on container 374 code and data at least in part through the combination of (1) boot component 370 enforcing a defined state of computer 310 wherein certain types of administrative memory access are deactivated, (2) core service component 371 securely obtaining decryption keys for container 374 file accesses, and (3) runtime decryption component 373 making use of the decryption keys on behalf of container 374. In some embodiments, the boot component 370, core service component 371 and/or runtime decryption component 373 can be hardware components that can be added to the computer 310 and that have individual memory and/or processor components. In other embodiments, the boot component 370, core service component 371 and/or runtime decryption component 373 may be able to a computer code designed with instructions to perform one or more different operations to facilitate performance of the trusted boot sequence. As a result of these measures, administrators of computer 310 cannot access unencrypted container 374 code and data in system memory 312, and administrators of computer 310 cannot obtain the decryption keys to decrypt container 374 code and data.

In some instances, a user can enter commands or information into the computer 310 through input device(s) 342. In other embodiments, any entity can enter commands or information into the computer 310. The entities can include, but are not limited to, robots, artificial intelligence devices, computers or the like.

Input devices 342 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 311 through the system bus 315 via interface port(s) 322. Interface port(s) 322 include, for example, a serial port, a parallel port, a game port, and a universal serial bus (USB). Output device(s) 341 use some of the same type of ports as input device(s) 342. Thus, for example, a USB port can be used to provide input to computer 310, and to output information from computer 310 to an output device 341. Output adapter 321 is provided to illustrate that there are some output devices 341 like monitors, speakers, and printers, among other output devices 341, which require special adapters. The output adapters 321 include, by way of illustration and not limitation, video and sound cards that provide a means of connection between the output device 341 and the system bus 315. It should be noted that other devices and/or systems of devices provide both input and output capabilities.

Computer 310 can operate in a networked environment using logical connections to one or more remote computers, such container registry 344 and trusted third party service device 345. The container registry 344 can include a server from which encrypted container images 317 are obtained. The trusted third party service device 345 can include a server from which decryption keys for encrypted container images 317 are obtained, e.g., by core service component 371 in conjunction with TPM 324. Other remote computer(s) with which computer 310 can communicate include computers, servers, routers, network PCs, workstations, microprocessor based appliances, peer devices or other common network nodes and the like, and typically can also include many or all of the elements described relative to computer 310.

Remote computer(s) such as 344 and 345 can be logically connected to computer 310 through a network interface 343 and then physically connected via communication connection 323. Network interface 343 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 323 refers to the hardware/software employed to connect the network interface 343 to the system bus 315. While communication connection 323 is shown for illustrative clarity inside computer 310, it can also be external to computer 310. The hardware/software for connection to the network interface 343 can also include, for exemplary purposes only, internal and external technologies such as, modems including regular telephone grade modems, cable modems and DSL modems, ISDN adapters, and Ethernet cards.

Figures 4A, 4B:
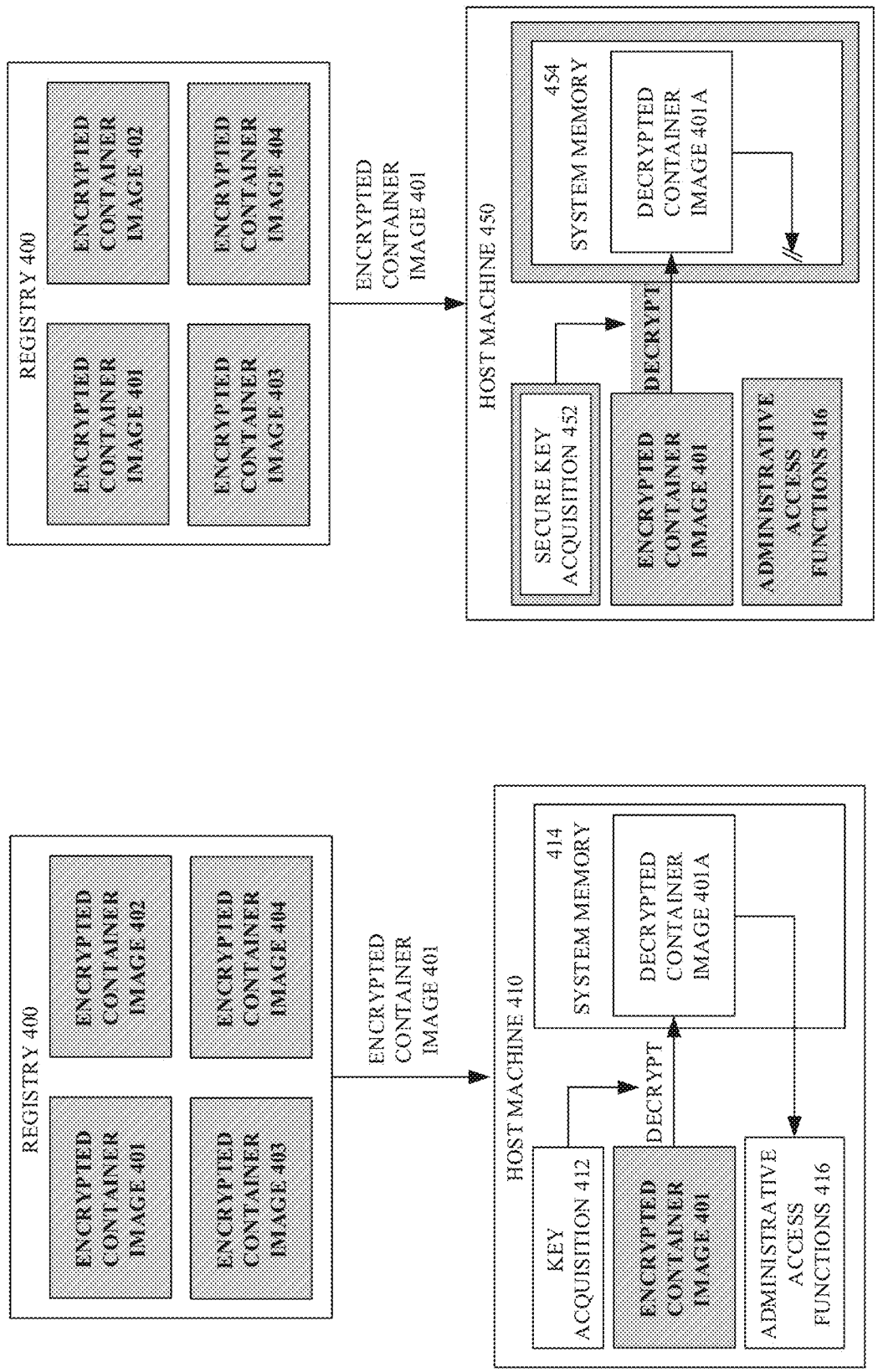
FIGS. 4A and 4B illustrate block diagrams of example, non-limiting systems that retrieve, store and run containers in accordance with one or more embodiments described herein.

FIGS. 4A and 4B illustrate block diagrams of an example, non-limiting systems that retrieve, store and run containers in accordance with one or more embodiments described herein. Repetitive description of like elements employed in other embodiments described herein is omitted for sake of brevity.

FIG. 4A illustrates a weakly secured host machine 410, which stands in contrast with the security hardened host machine 450 illustrated in FIG. 4B. In both FIG. 4A and FIG. 4B, the respective host machines 410, 450, can retrieve an encrypted container image 401 from a registry 400. Registry 400 includes multiple encrypted container images 401, 402, 403, and 404.

Host machine 410 and registry 400 can provide, for example, cloud computing nodes among the cloud computing nodes 10 illustrated in FIG. 1. Host machine 410 can be a server equipped to host containers without, for example, security features such as boot component 370, core service component 371, and runtime decryption component 373 illustrated in FIG. 3. As such, host machine 410 can retrieve encrypted container image 401 securely from registry 400. Key acquisition component 412 can furthermore acquire decryption keys to decrypt encrypted container image 401.

Once the encrypted container image 401 is decrypted and loaded into system memory 414 as decrypted container image 401A, the code and data in the decrypted container image 401A may be no longer effectively protected. The code, data, and configuration a developer puts into encrypted container image 401 are exposed for administrators of host machine 410 to see, in plain sight or with a small amount of work. Indeed, in some instances, decrypted container image 401A can be stored as plaintext at host machine 410.

Furthermore, in host machine 410, any of a variety of administrative access functions 416 can be used to access decrypted container image 401A within system memory 414. For example, administrative access to the container memory within system memory 414 can be accomplished through booting from a modified kernel, for example, in circumstances wherein host machine 410 is not booted using a trusted boot sequence. Administrative access to the container memory within system memory 414 can also be accomplished through loading additional kernel modules, in addition to kernel modules of a trusted kernel.

In some instances, administrative access to the container memory within system memory 414 can also be accomplished through one or more virtual memory management devices, e.g., using/dev/mem, /dev/kmem, and/proc/kcore virtual memory management devices. Administrative access to the container memory within system memory 414 can also be accomplished through one or more runtime debugging functions. Runtime debugging functions are generally functions which allow a process to attach to another process, and can, for example allow the root to pause running processes and peek at their memory. Examples of runtime debugging functions include ptrace and extended Berkeley Packet Filter (eBPF).

In some instances, administrative access to the container memory within system memory 414 can also be accomplished through pausing a running process to view a memory associated with the running process. Administrative access to the container memory within system memory 414 can also be accomplished or through kernel memory swap operations, in which a kernel writes portions of system memory 414 to disk to fee up space in system memory. Kernel memory swap can be triggered deliberately by loading excess data into system memory 414.

In summary, while host machine 410 can retrieve encrypted container image 401 from registry 400 securely, the encrypted container image 401 may be vulnerable to rogue administrators after it is decrypted at host machine 410. Occasionally encrypted container images such as 401 can include any of a wide variety of sensitive information such as proprietary code and algorithms, patient/health data, machine learning (ML) models, etc. As discussed below, host machine 450 implements a set of security hardening features which improve the security of encrypted container image 401 at host machine 450 to protect such sensitive information.

In some embodiments, host machine 450 can provide improved security. Like host machine 410, host machine 450 can provide, e.g., a cloud computing node among the cloud computing nodes 10 illustrated in FIG. 1, and host machine 450 can comprise a server equipped to host containers. However, in contrast with host machine 410, host machine 450 can implement, e.g., the security features such as boot component 370, core service component 371, and runtime decryption component 373 illustrated in FIG. 3. As such, host machine 450 can securely retrieve encrypted container image 401 from registry 400, acquire decryption keys to decrypt encrypted container image 401, and decrypt and run the encrypted container image 401.

Boot component 370 can execute one or more operations to carry out a part of a trusted boot sequence at host machine 450 to securely boot the host machine 450 to a defined secure state wherein one or more types of administrative access to a container memory, within system memory 454, are deactivated. In FIG. 4B, administrative access functions 416 are deactivated, and the arrow originating from decrypted container image 401A and facing administrative access functions 416 is blocked. In an implementation, system memory 454 can be protected from all users, including administrators or root users of host machine 450, by using trusted boot to prevent kernel code, kernel configuration, and core services from tampering. Furthermore, certain kernel options and virtual devices that would allow particular users having a certain set of privileges (e.g., root users, which can have default access to various commands and files in a particular operating system) to peek into system memory 454 can be deactivated. Alternatively, secure hardware technologies can be used to secure system memory 454.

Core service component 371 can be started as a part of the trusted boot sequence, and can implement the secure key acquisition 452 illustrated in FIG. 4B. Secure key acquisition 452 can securely obtain one or more decryption keys for use with the encrypted container image 401, without allowing particular users of host machine 450 to access the decryption keys. For example, retrieved decryption keys can be stored in system memory 454, which is protected from administrative access functions 416.

In an example embodiment, core service component 371 can be started as a part of the trusted boot sequence using TPM 324 and PCRs 325. When decryption keys are needed, core service component 371 can perform TPM remote attestation, using TPM 324, to acquire the decryption keys from trusted third party service device 345. If TPM remote attestation succeeds, one or more decryptions keys can be provided to secure key acquisition 452 by trusted third party service device 345. The obtained decryption keys can be kept in system memory 454, wherein the trusted boot sequence implemented by boot component 370 guarantees root users cannot acquire decryption keys from system memory 454.

When a container is started at host machine 450, e.g., a runtime decryption component 373 can use the decryption keys acquired by secure key acquisition 452 to decrypt the container image, e.g., to decrypt encrypted container image 401, to thereby load decrypted container image 401A in system memory 454. Runtime decryption component 373 can furthermore perform runtime decryption of files accessed by the decrypted container image 401A.

In some embodiments, runtime decryption component 373 can be implemented at least in part as a file system intermediary. When a container is started at host machine 450, a file system intermediary can be placed on the root file system of the container, making all file accesses go through the file system intermediary. For non-encrypted files, file accesses can simply pass through the file system intermediary. When an encrypted file is accessed, the process identifier (PID) of the requesting process can be checked. If the PID belongs to the entrypoint process of the container or a descendant process of the entrypoint process, then the file can be decrypted. If the PID of the requesting process does not belong to the entrypoint process or a descendant of the entrypoint process, then decryption can be prevented.

In summary, with regard to FIG. 4B, host machine 450 can secure decrypted code and data of a container through several security hardening measures, which can be employed alone or in combination. The host machine 450 is booted to a secure state to ensure that the host machine 450 kernel can be trusted, and to deactivate any of a variety of administrative access functions 416 that otherwise enable access to system memory 454. The host machine 450 can include secure key acquisition 452, such as core service component 371, to securely retrieve and store decryption keys in a location such as in system memory 454, where the decryption keys cannot be accessed by users of host machine 450. The host machine 450 can then securely decrypt container data at container runtime.

Figure 5:
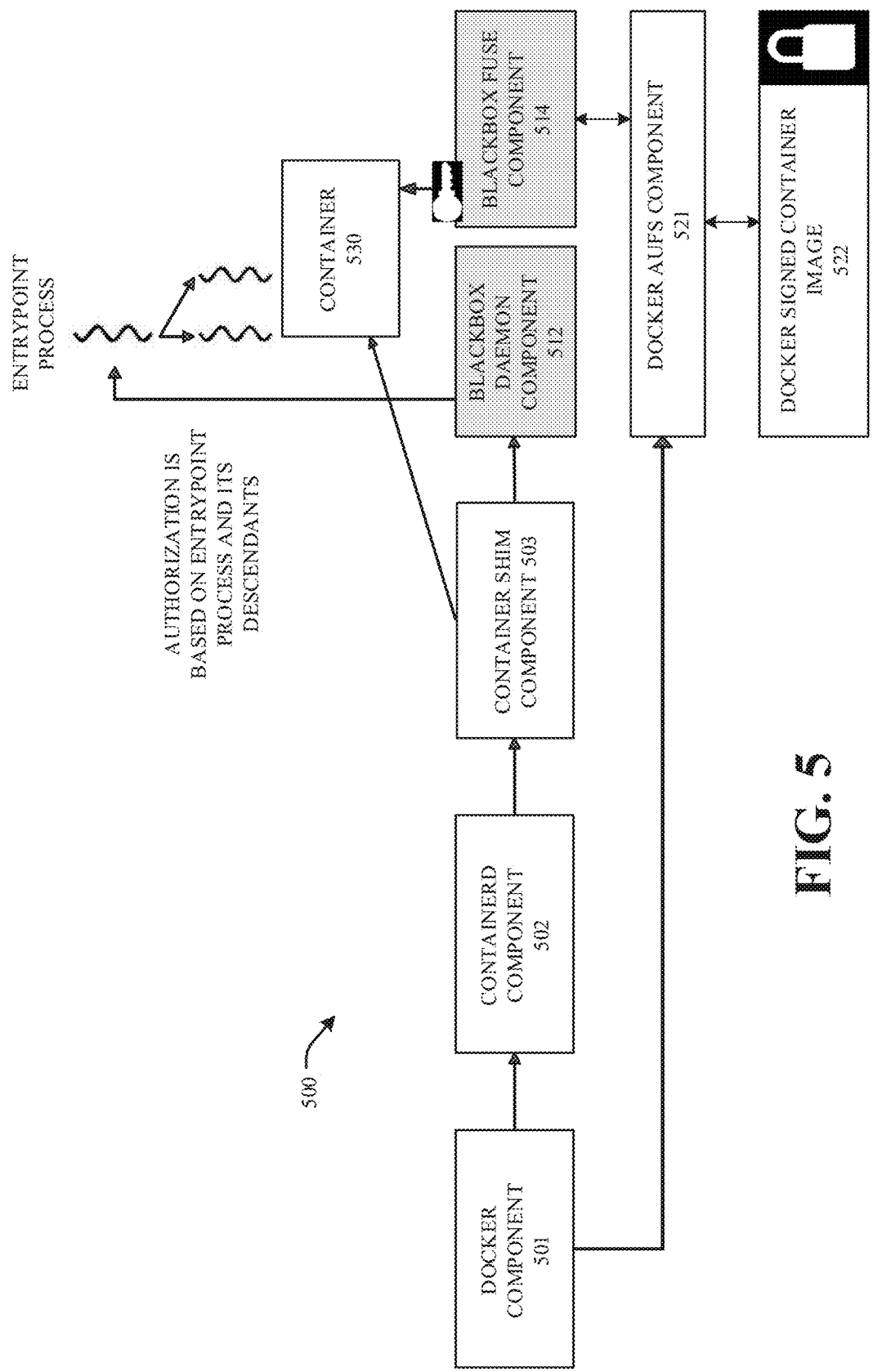
FIG. 5 illustrates a block diagram of an example, non-limiting system that employs modified docker technology to secure containers in accordance with one or more embodiments described herein.

FIG. 5 illustrates a block diagram of an example, non-limiting system that employs modified docker technology to secure containers in accordance with one or more embodiments described herein. Repetitive description of like elements employed in other embodiments described herein is omitted for sake of brevity.

The embodiment shown in FIG. 5 includes a modified docker-based system and method 500 for container runtime operations. Docker component 501 is a docker daemon, which provides a container engine. To run a container included in docker signed container image 522, docker component 501 can call containerd component 502, which provides a container daemon. As used herein, the term "containerd component" means the container daemon component. Docker component 501 also starts a docker advanced multi-layered unification filesystem (AUFS) component 521. In some embodiments, docker signed container image 522 can be annotated using, for example, extended file attributes or special file names to indicate that docker signed container image 522 is subject to security hardening measures disclosed herein.

Containerd component 502 starts a container shim component 503, which provides the runtime environment for an individual container 530. After rootfs is mounted by a container storage driver, containerd component 502 can make a remote procedure call (RPC) to blackbox daemon component 512.

In this example, blackbox daemon component 512 implements a core service component such as 371, described in connection with FIG. 3. Blackbox daemon component 512 can be initially started as a part of the trusted boot sequence, for example secured by PCR #10 in PCRs 325. At startup, blackbox daemon component 512 can perform TPM remote attestation, and afterwards, blackbox daemon component 512 can for example retrieve a list of sealed decryption keys from a trusted third party service device 345. Blackbox daemon component 512 can unseal the retrieved decryption keys in memory. Blackbox daemon component 512 can call TPM_PCR_Extend PCR #10 upon completion.

At container runtime, in response to the RPC call from containerd component 502, and if the docker signed container image is signed, blackbox daemon component 512 can, for example, initiate the entrypoint process, and begin decrypting files on behalf of container 530 on an as-needed basis, while storing clear text or otherwise decrypted files only in memory that is protected from users such as root users (or other users with default access to various commands or files in an operating system).

Furthermore, blackbox daemon component 512 can start a blackbox filesystem in user space (FUSE) component 514, to start a FUSE process with a decryption key for container 530. Blackbox FUSE component 514 provides a runtime decryption component 373 in the embodiment of FIG. 5. Blackbox FUSE component 514 sits above the rootfs of the container 530, that is the docker AUFS component 521, as an intermediary filesystem layer. Blackbox FUSE component 514 decrypts encrypted files if the requesting process is the entrypoint process (which in some instances may also be the init process) of the container 530 or a descendant process of the entrypoint (or init) process of the container 530. Blackbox FUSE component 514 can also retrieve any unencrypted files for the requesting process.

Figure 6:
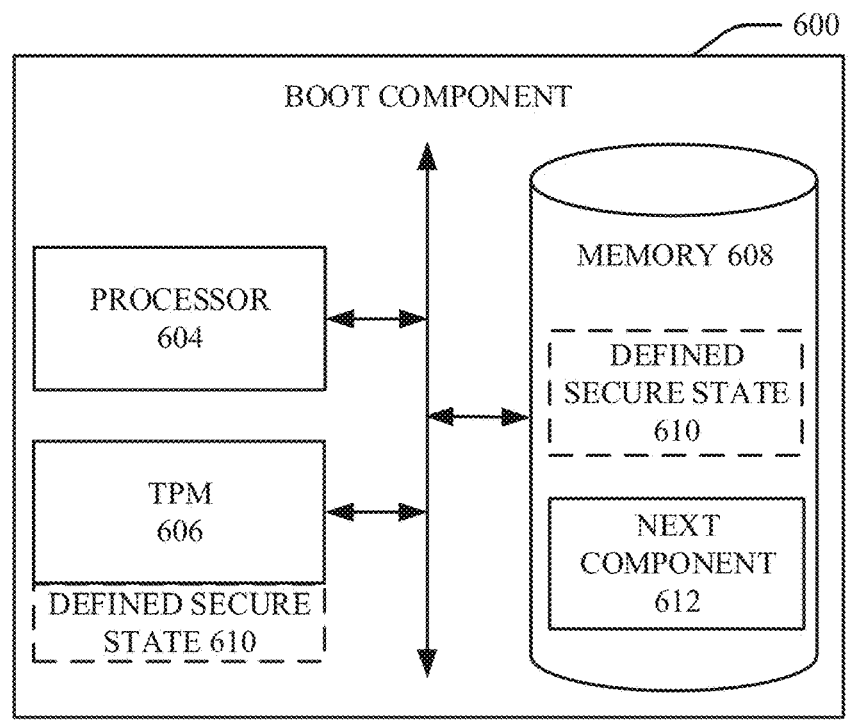
FIG. 6 illustrates a high-level block diagram of an example, non-limiting boot component in accordance with one or more embodiments described herein.

FIG. 6 illustrates a high-level block diagram of an example, non-limiting boot component in accordance with one or more embodiments described herein. Repetitive description of like elements employed in other embodiments described herein is omitted for sake of brevity.

Aspects of the boot component 600 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, memory 608 can store computer executable components and instructions. Furthermore, the processor 604 can facilitate operation of the instructions (e.g., computer executable components and instructions) associated with the boot component 600.

As shown in FIG. 6, in some embodiments, the boot component 600 can include a processor 604, a TPM 606, and a memory 608. In other embodiments, in lieu of having separate processor 604, the boot component 600 can access and/or share a processor with one or more of processor 704 of core service component 700 (FIG. 7), processor 804 of runtime decryption component 800 (FIG. 8) and/or processing unit 311 (FIG. 3). Accordingly, in the embodiment shown, boot component 600 is hardware, although boot component 600 can be implemented as computer code, or one or more operations of boot component 600 can be implemented via computer code, in some embodiments.

TPM 606 can include a defined secure state 610, e.g., in a PCR of PCRs 325. Memory 608 can include, e.g., a next component 612 and optionally a defined secure state 610. In a non-limiting example, the elements of FIG. 3 are implemented in FIG. 6. The boot component 600 provides an example of a boot component 370 incorporated into the computer 310. Likewise, processor 604 can provide a processor 311, memory 608 can provide system memory 312 or other memory included in computer 310, and TPM 606 can provide the TPM 324 of FIG. 3.

In certain implementations, as indicated by the arrow underneath the boot component 600, the boot component 600 can be employed to carry out part of a sequence of operations noted as a trusted boot sequence for a system. The boot component 600 can perform at least a portion of the trusted boot sequence, and boot component 600 can then cause a next component 612 to operate or execute as part of the trusted boot sequence. The result of the trusted boot sequence is that such sequence of operations can securely boot a system to a defined secure state according to defined secure state 610, wherein one or more types of administrative access to a container memory are deactivated.

In a non-limiting example, the boot component 600 can check next component 612 to ensure that next component 612 satisfies defined secure state 610. Defined secure state 610 can include a state wherein one or more types of administrative access to container memory are deactivated. That is, after the computer 310 is fully booted according to defined secure state 610, certain functions which commonly provide administrative access to particular system sections (e.g., system memory) can be deactivated.

For example, in an embodiment, next component 612 can comprise an operating system kernel. Defined secure state 610 can comprise a hash of a kernel wherein administrative access functions associated with certain types of administrative memory access are deactivated. Boot component 600 can perform a hash of next component 612, or portions thereof, and boot component 600 can check that the measured hash matches the hash stored in defined secure state 610. Boot component 600 can load next component 612 if the hashes match, or stop the trusted boot sequence if the hashes do not match.

TPM 606 can securely store the hash of the next component 612, e.g., in a PCR of PCRs 325. Boot component 600 can measure a hash of next component 612 and pass the hash value to TPM 606. When the hash values match, TPM 606 can notify boot component 600 that the next component 612 can be safely loaded, and boot component 600 can load next component 612. When the hashes do not match, TPM 606 can notify boot component 600 and boot component 600 can stop the trusted boot sequence.

In some instances, a core service component such as described in connection with FIG. 7 can comprise at least one aspect of defined secure state 610. In such cases, the boot component 600 can guarantee both deactivated administrative access functions, and the presence of a core service component in the booted system. Boot component 600 can perform a hash of a core service component, an operating system kernel, or any other next component 612, or combinations thereof.

Other approaches to specify a defined secure state 610 can be implemented in other embodiments. For example, defined secure state 610 can comprise a list of administrative access functions to be deactivated in next component 612. Boot component 600 can read defined secure state 610 from memory 608, and boot component 600 can inspect next component 612 to ensure the listed administrative access functions are deactivated. If the listed administrative access functions are deactivated, boot component 600 can load next component 612. If the listed administrative access functions are not deactivated, boot component 600 can stop the trusted boot sequence.

Figure 7:
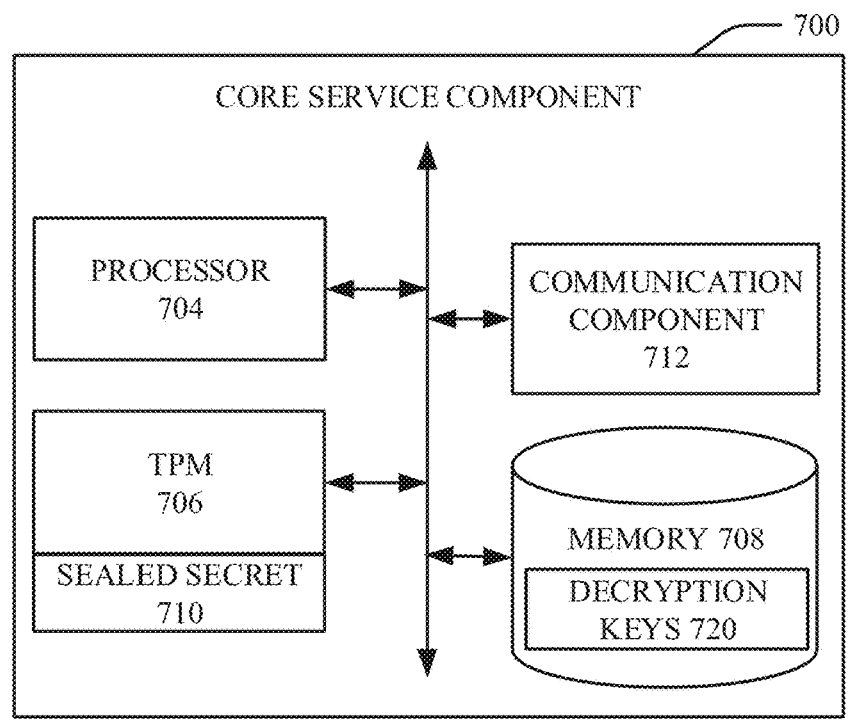
FIG. 7 illustrates a high-level block diagram of an example, non-limiting core service component in accordance with one or more embodiments described herein.

FIG. 7 illustrates a high-level block diagram of an example, non-limiting core service component in accordance with one or more embodiments described herein. Repetitive description of like elements employed in other embodiments described herein is omitted for sake of brevity.

Aspects of the core service component 700 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, memory 708 can store computer executable components and instructions. Furthermore, the processor 704 can facilitate operation of the instructions (e.g., computer executable components and instructions) associated with the core service component 700.

As shown in FIG. 7, in some embodiments, the core service component 700 can include a processor 704, a TPM 706, a memory 708, and a communication component 712. In other embodiments, in lieu of having separate processor 704, the core service component 700 can access and/or share a processor with one or more of processor 604 of boot component 600 (FIG. 6), processor 804 of runtime decryption component 800 (FIG. 8) and/or processing unit 311 (FIG. 3). Accordingly, in the embodiment shown, core service component 700 is hardware, although core service component 700 can be implemented as computer code, or one or more operations of core service component 700 can be implemented via computer code, in some embodiments.

TPM 706 can include a sealed secret 710. Memory 708 can include, for example, decryption keys 720. Core service component 700 can optionally be started as a part of the trusted boot sequence described above with reference to the boot component 600. Core service component 700 can securely obtain one or more decryption keys 720 for use with container memory. In a non-limiting example, the elements of FIG. 3 are implemented in FIG. 7. The core service component 700 is an example of an embodiment of core service component 371 of FIG. 3.

In some examples, the core service component 700 can obtain a package of decryption keys 720 at computer 310 startup, for use with multiple containers hosted at computer 310. Core service component 700 can for example identify multiple container images stored at computer 310, and core service component 700 can employ communication component 712 and TPM 706 to perform a TPM 706 remote attestation to trusted third party service device 345. TPM 706 can for example provide a sealed secret 710 to the trusted third party service device 345. Trusted third party service device 345 can authenticate the computer 310 using the sealed secret 710. Trusted third party service device 345 can then return, for example, a bundle of requested decryption keys to core service component 700. Core service component 700 can store the returned decryption keys as decryption keys 720 in memory 708. The decryption keys can then be used in connection with decrypting container data for corresponding containers as appropriate.

In some examples, the core service component 700 can obtain decryption keys 720 for individual containers at container runtime. When a container is loaded at computer 310, core service component 700 can employ communication component 712 and TPM 706 to perform a TPM 706 remote attestation to trusted third party service device 345, as described herein. Trusted third party service device 345 can then return, for example, the requested decryption key to core service component 700. Core service component 700 can store the returned decryption key as a decryption key of decryption keys 720 in memory 708. The decryption key can then be used in connection with decrypting container data. Because decryption keys 720 are loaded in memory 708, and memory 708 is protected from administrator view by the boot component 600, the decryption keys 720 remain secure and inaccessible to decrypt container data without authorization.

Figure 8:
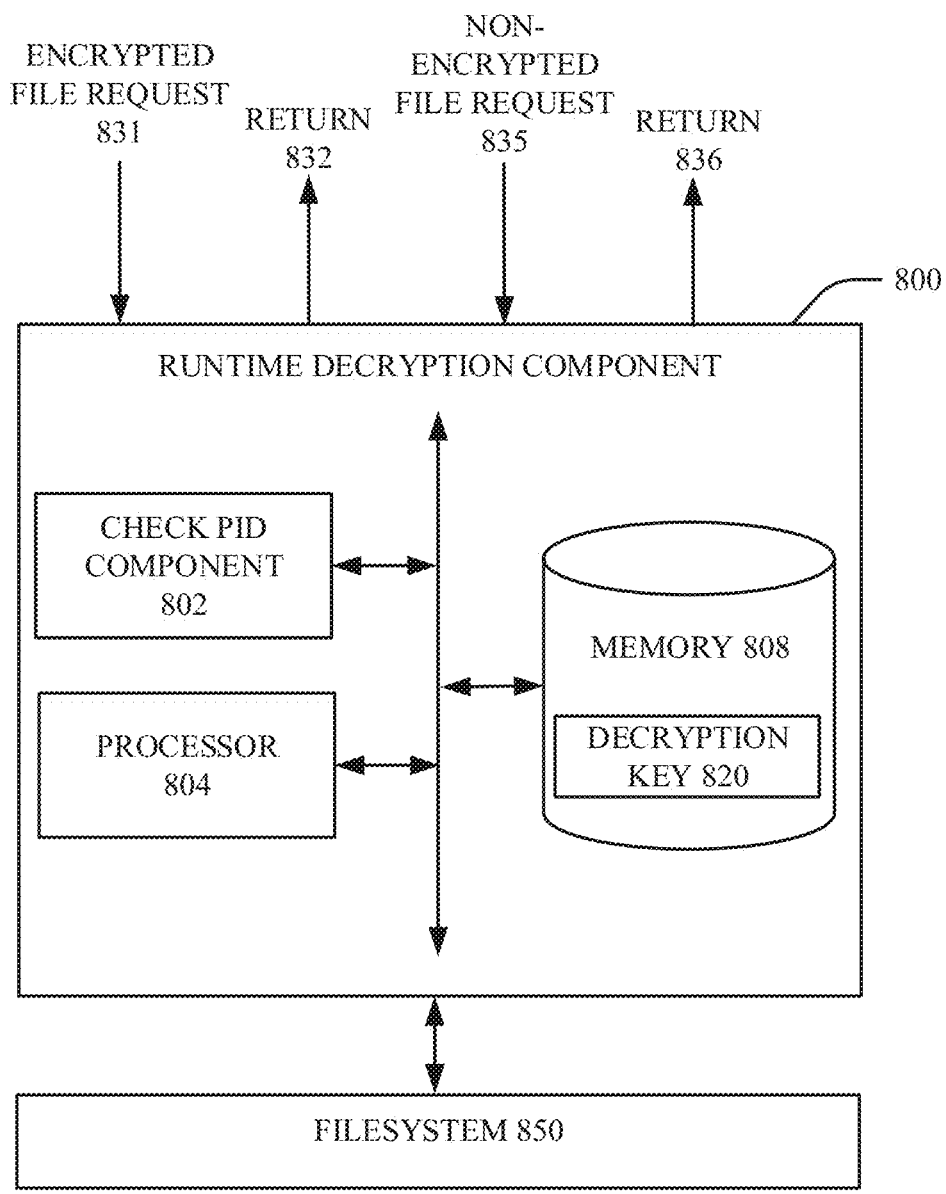
FIG. 8 illustrates a flow diagram of an example, non-limiting runtime decryption component in accordance with one or more embodiments described herein.

FIG. 8 illustrates a high-level block diagram of an example, non-limiting runtime decryption component in accordance with one or more embodiments described herein. Repetitive description of like elements employed in other embodiments described herein is omitted for sake of brevity.

Aspects of the runtime decryption component 800 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, memory 808 can store computer executable components and instructions. Furthermore, the processor 804 can facilitate operation of the instructions (e.g., computer executable components and instructions) associated with the runtime decryption component 800.

As shown in FIG. 8, the runtime decryption component 800 can include a processor 804, a check PID component 802, and a memory 808. As shown in FIG. 8, in some embodiments, the runtime decryption component 800 can include a processor 804, a check PID component 802, and a memory 808. Accordingly, in the embodiment shown, runtime decryption component 800 is hardware, although runtime decryption component 800 can be implemented as computer code, or one or more operations of runtime decryption component 800 can be implemented via computer code, in some embodiments. In other embodiments, in lieu of having separate processor 804, the runtime decryption component 800 can access and/or share a processor with one or more of processor 604 of boot component 600 (FIG. 6), processor 704 of core service component (FIG. 7) and/or processing unit 311 (FIG. 3).

Memory 808 can include, e.g., decryption key 820. Runtime decryption component 800 can use decryption key 820, e.g., a decryption key retrieved by core service component 700, to perform runtime decryption of one or more files accessed by a container 374 associated with a container memory within system memory 312. In a non-limiting example, the elements of FIG. 3 are implemented in FIG. 8. The runtime decryption component 800 can provide an example of a runtime decryption component 373 incorporated into the computer 310. Likewise, processor 804 can provide a processor 311, memory 808 can provide system memory 312 or other memory included in computer 310.

In some examples, runtime decryption component 800 can receive file requests from a container 374. The file requests can comprise, e.g., encrypted file request 831 and non-encrypted file request 835. Encrypted file request 831 is a request for an encrypted file, and non-encrypted file request 835 is a request for a non-encrypted file. Runtime decryption component 800 can handle the requests 831, 835 differently, however runtime decryption component 800 can ultimately return the requested files, e.g., as return 832, corresponding to encrypted file request 831, and return 836, corresponding to non-encrypted file request 836.

For encrypted file request 831, runtime decryption component 800 can employ check PID component 802 to check a process identifier (PID) of the requesting process. Check PID component 802 can ensure the PID of the requesting process belongs to an entrypoint process of the container 374, or a descendant process of the entrypoint process. If the PID does belong to the entrypoint process or a descendant, the runtime decryption component 800 can proceed to retrieve the requested file from filesystem 850, decrypt the requested file using decryption key 820, and return 832 the requested file. If the PID is not authorized, then the runtime decryption component 800 can throw an error.

For non-encrypted file request 835, in an implementation, runtime decryption component 800 can pass through the request 835 to filesystem 850. Filesystem 850 can return the requested non-encrypted file to runtime decryption component 800, and runtime decryption component 800 can return the requested file to the requesting container at return 836.

While FIG. 6, FIG. 7, and FIG. 8 depict separate components, namely boot component 600, core service component 700 and runtime decryption component 800, respectively, it is to be appreciated that two or more components can be implemented in a common component. Further, it is to be appreciated that the design of the boot component 600, core service component 700 and runtime decryption component 800 can include other component selections, component placements, etc., to facilitate enhanced container security. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Figure 9:
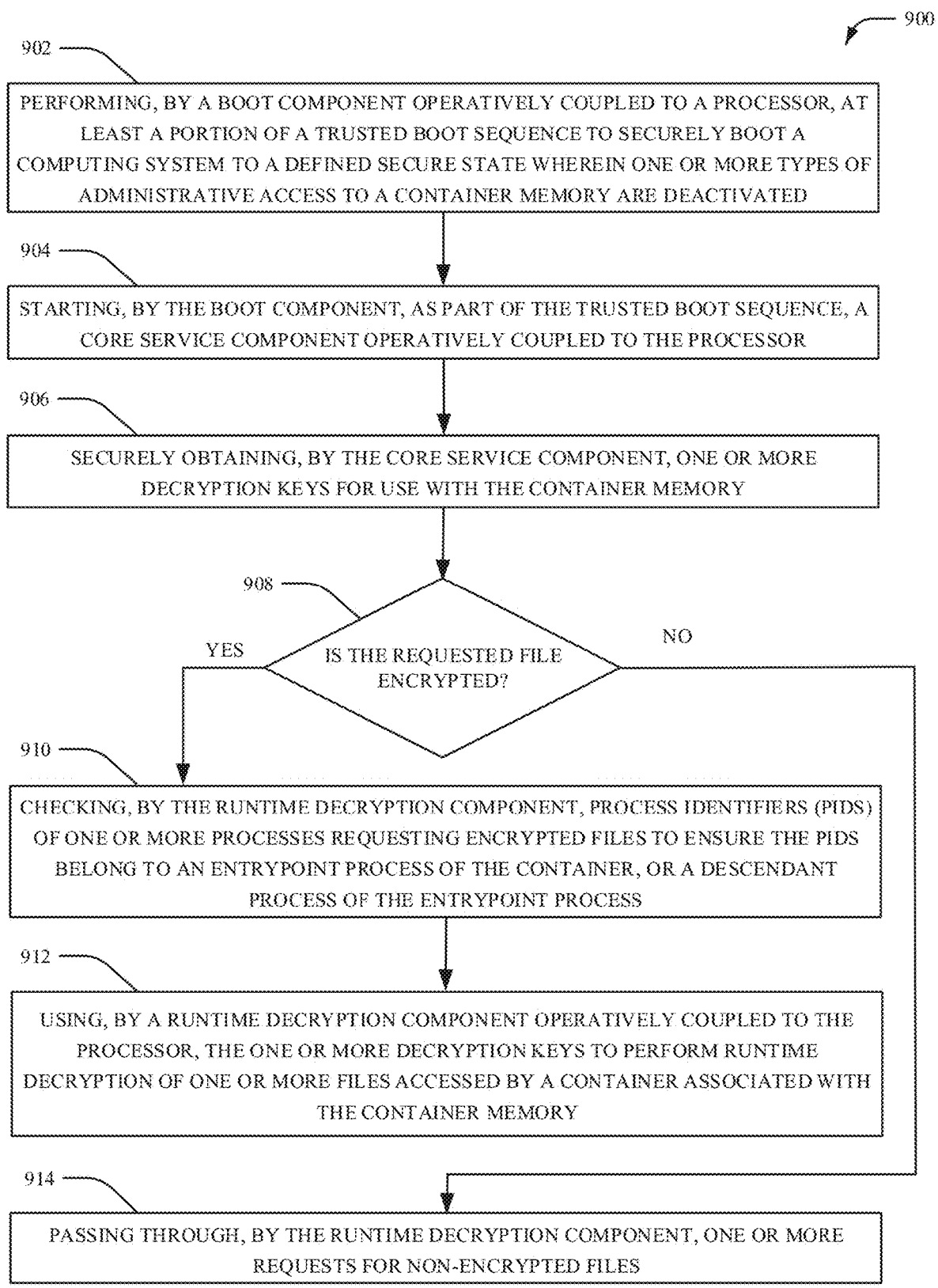
FIG. 9 illustrates a flow diagram of an example, non-limiting computer-implemented method that facilitates security hardening of a system which hosts containers in accordance with one or more embodiments described herein.

FIG. 9 illustrates a flow diagram of an example, non-limiting computer-implemented method 900 that facilitates security hardening of a system which hosts containers in accordance with one or more embodiments described herein. The method of FIG. 9 is described with reference to the computer 310 illustrated in FIG. 3. The computer-implemented method of FIG. 9 enhances security of containers such as 374 at a container server such as computer 310 by securing data associated with the container 374 from one or more types of administrative access to container memory during instantiation and runtime of the container 374 at the container server such as computer 310.

At 902, a boot component 370 operatively coupled to a processor 311 performs at least a portion of a trusted boot sequence to securely boot a computer 310 to a defined secure state wherein one or more types of administrative access to a container memory (a container memory portion of system memory 312) are deactivated. Example types of administrative access to the container memory which are deactivated include, but are not limited to administrative access to the container memory through booting from a modified kernel which is modified with respect to a trusted kernel associated with the trusted boot sequence; administrative access to the container memory through loading additional kernel modules, in addition to kernel modules of the trusted kernel; administrative access to the container memory through one or more virtual memory management devices; administrative access to the container memory through one or more runtime debugging functions; administrative access to the container memory through pausing a running process to view a memory associated with the running process; and administrative access to the container memory through kernel memory swap operations. In an implementation, the trusted boot sequence can include performing a hash on computer code stored at, or accessible by, the core services component 371, and storing a resulting core service component 371 hash value in a PCR of PCRs 325.

At 904, the boot component 370 starts, as part of the trusted boot sequence, a core service component 371 operatively coupled to the processor 311. At 906, in an implementation, the core service component 371 securely obtains one or more decryption keys for use with the container memory portion of system memory 312. In an implementation, the securely obtaining the one or more decryption keys can employ TPM 324 remote attestation to a trusted third party service device 345.

At 908, it is determined, e.g., by runtime decryption component 373, whether a file requested by container 374 is encrypted. If yes, at 910, runtime decryption component 373 can check process identifiers (PIDs) of one or more processes requesting encrypted files to ensure the PIDs belong to an entrypoint process of the container 374, or a descendant process of the entrypoint process. At 912, runtime decryption component 373 can use the one or more decryption keys obtained by core service component 371 to perform runtime decryption of one or more files accessed by container 374, the container 374 being associated with the container memory portion of system memory 312. In some examples, the runtime decryption component 373 can initially employ the one or more decryption keys to decrypt an encrypted container image to instantiate the container 374.

In response to a determination, by runtime decryption component 373 at 904, that a file requested by container 374 is not encrypted, runtime decryption component 373 can pass through, at 914, one or more requests for non-encrypted files.

Figure 10:
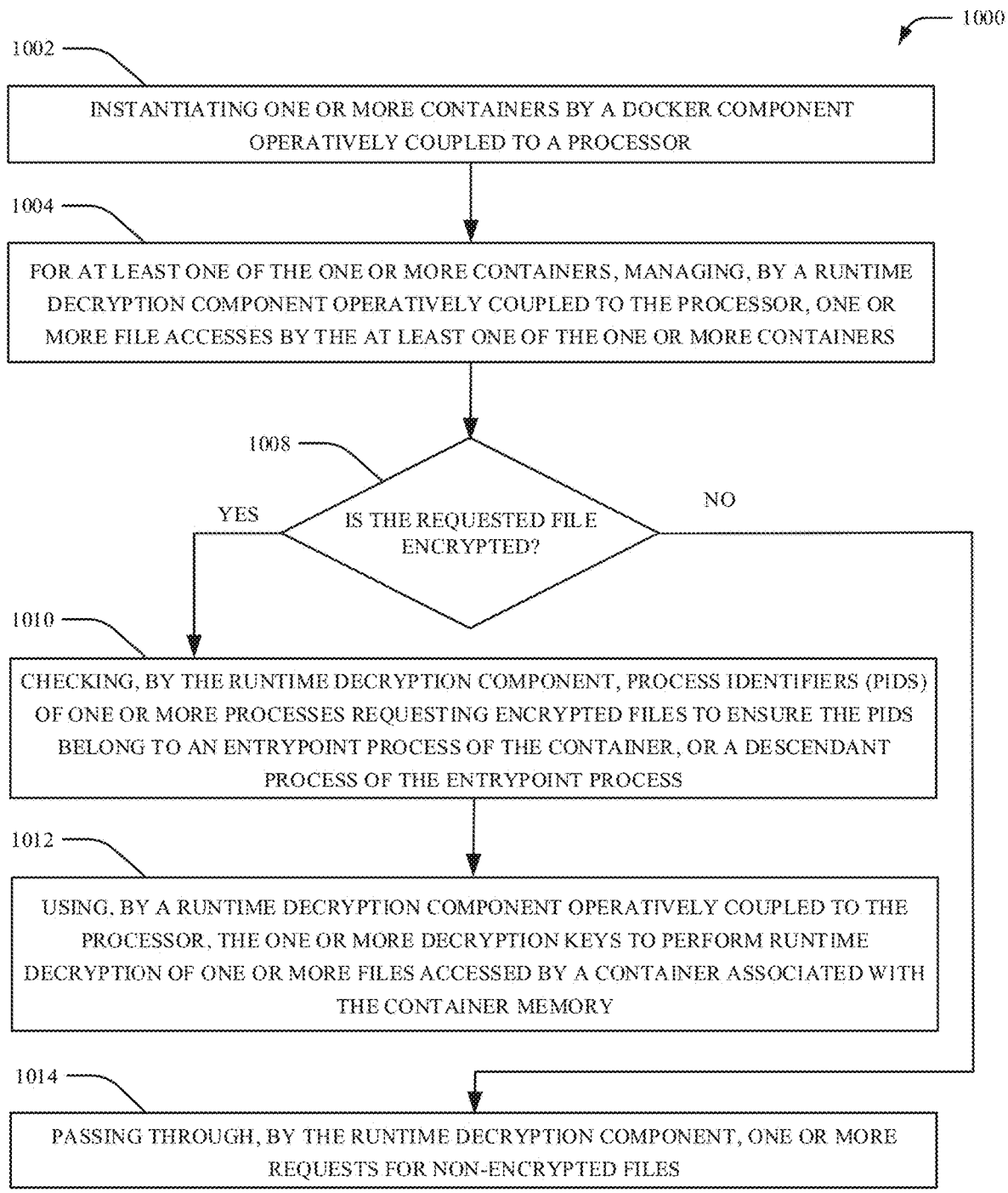
FIG. 10 illustrates a flow diagram of an example, non-limiting computer-implemented method that facilitates security hardening of a system which hosts containers in accordance with one or more embodiments described herein.

FIG. 10 illustrates a flow diagram of another example, non-limiting computer-implemented method 1000 that facilitates security hardening of a system which hosts containers in accordance with one or more embodiments described herein. The method of FIG. 10 is described with reference to the docker-based embodiment illustrated in FIG. 5. At 1002, a docker component 501 operatively coupled to a processor (not shown in FIG. 5) can instantiate one or more containers such as container 530. In an implementation, instantiating the one or more containers 530 by the docker component 501 can comprise instantiating at least one first container daemon component 502 operatively coupled to the processor, instantiating, by the first container daemon component 502, a runtime decryption component such as blackbox FUSE component 514, and instantiating, by the blackbox FUSE component 514, the at least one of the one or more containers 530. In some instances, blackbox daemon component 512 can instantiate the container 530.

At 1004, for at least one of the one or more containers 530, a runtime decryption component such as blackbox FUSE component 514 can manage one or more file accesses by the at least one of the one or more containers 530. At 1008, blackbox FUSE component 514 can determine whether a requested file is encrypted. If the requested file is encrypted, the blackbox FUSE component 514 comprises a filesystem intermediary which can, at 1010, check the PIDs of one or more processes requesting access to encrypted files to ensure the PIDs belong to an entrypoint process of the container 530 or a descendant process of the entrypoint process. If the PIDs are authorized, at 1012 the blackbox FUSE component 514 can retrieve, decrypt and return the requested files. For example, as described with reference to FIG. 5, blackbox daemon component 512 can start a blackbox filesystem in user space (FUSE) component 514, to start a FUSE process with a decryption key for container 530. Blackbox FUSE component 514 provides a runtime decryption component 373 in the embodiment of FIG. 5. Blackbox FUSE component 514 sits above the rootfs of the container 530, that is the docker AUFS component 521, as an intermediary filesystem layer. Blackbox FUSE component 514 decrypts encrypted files if the requesting process is the entrypoint process (which in some instances may also be the init process) of the container 530 or a descendant process of the entrypoint (or init) process of the container 530.

Blackbox FUSE component 514 can also retrieve any unencrypted files for the requesting process. If the requested file is not encrypted, at 1014 the blackbox FUSE component 514 can pass through, to docker AUFS component 521, one or more requests to access non-encrypted files.

Figure 11:
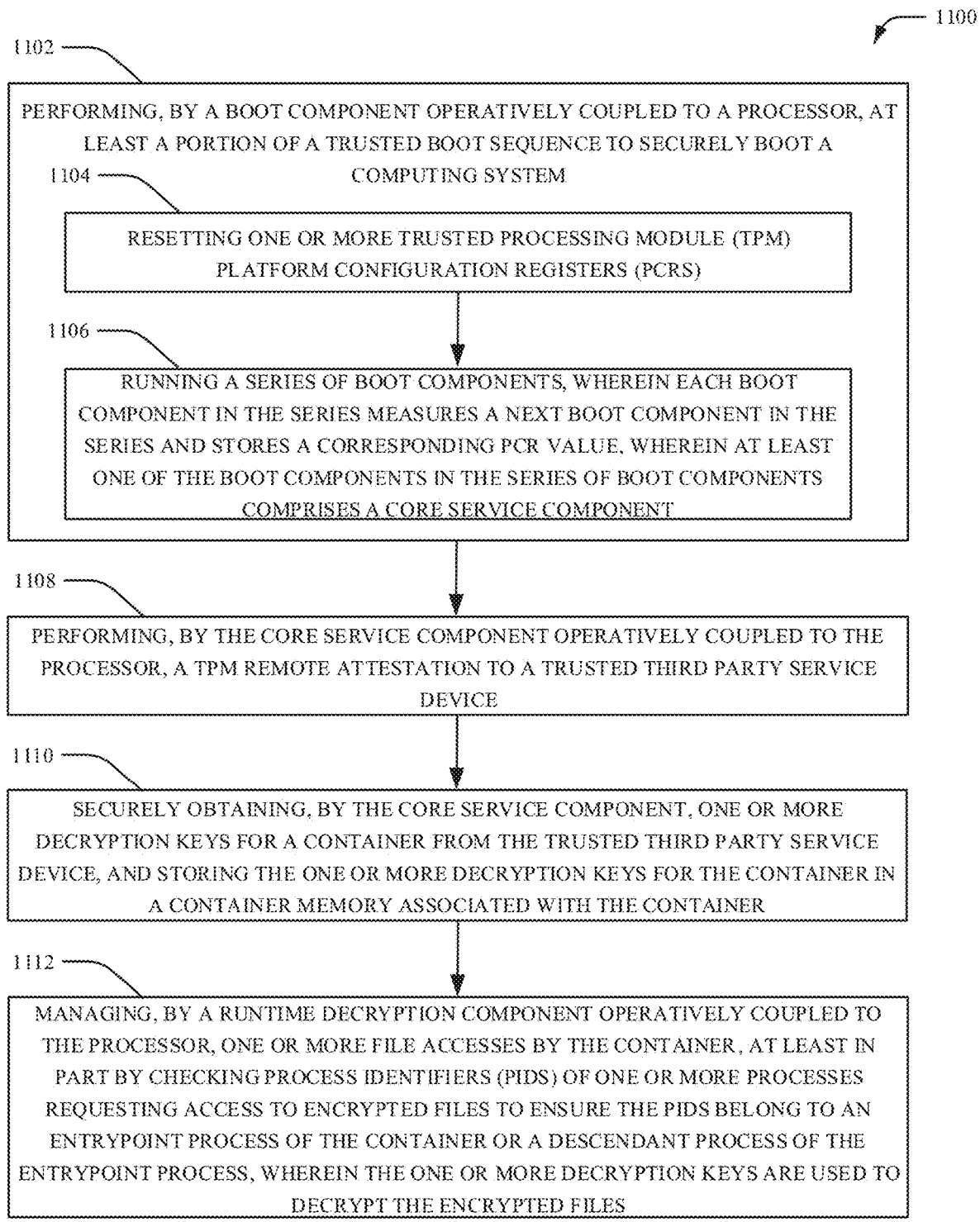
FIG. 11 illustrates a flow diagram of an example, non-limiting computer-implemented method that facilitates security hardening of a system which hosts containers in accordance with one or more embodiments described herein.

FIG. 11 illustrates a flow diagram of another example, non-limiting computer-implemented method 1100 that facilitates security hardening of a system which hosts containers in accordance with one or more embodiments described herein. The method of FIG. 11 is described with reference to FIG. 3.

At 1102, a boot component 370 operatively coupled to a processor 311 can perform at least a portion of a trusted boot sequence to securely boot a computer 310. The trusted boot sequence can comprise, for example, at 1104, resetting one or more PCRs 325, and at 1106, running a series of boot components, wherein each boot component in the series performs a hash of computer code stored at, or accessible by, a next boot component in the series and stores a corresponding PCR hash value and/or uses TPM 324 to compare the next boot component hash value against a stored PCR hash value. The trusted boot sequence securely boots the computer 310 to a defined secure state wherein one or more types of administrative access to a container memory portion of system memory 312 are deactivated. As described herein, least one of the boot components in the series of boot components can comprises a core service component 371, or the core service component 371 can be included in a trusted kernel loaded at the end of the trusted boot sequence.

At 1108, the core service component 371 operatively coupled to the processor 311 can perform a TPM 324 remote attestation to a trusted third party service device 345. At 1110, the core service component 371 can securely obtain one or more decryption keys for a container 374 from the trusted third party service device 345, and the core service component 371 can store the one or more decryption keys for the container 374 in a container memory associated with the container 374.

At 1112, a runtime decryption component 373 operatively coupled to the processor 311 can manage one or more file accesses by the container 374, at least in part by checking PIDs of one or more processes requesting access to encrypted files to ensure the PIDs belong to an entrypoint process of the container 374 or a descendant process of the entrypoint process, wherein the one or more decryption keys obtained at 1110 are used to decrypt the encrypted files.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because configuration of data packet(s) and/or communication between components is established from a combination of electrical and mechanical components and circuitry, a human is unable to replicate or perform the subject data packet configuration and/or the subject communication between processing components and/or an assignment component. For example, a human is unable to measure a hash of a next component in a boot process, or to decrypt an encrypted file, etc. Moreover, a human is unable to packetize data that can include a sequence of bits corresponding to information generated during the various container security processes, or transmit data that can include a sequence of bits corresponding to information generated during the security processes described herein, etc.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM).

Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system, comprising:
    a memory that stores computer executable components;
    a processor that executes computer executable components stored in the memory, wherein the computer executable components comprise:

a boot component that performs at least a portion of a trusted boot sequence to securely boot the system to a defined secure state wherein one or more types of administrative access to a container memory are deactivated;

a core service component started as a part of the trusted boot sequence and that securely obtains one or more decryption keys for use with the container memory; and a runtime decryption component that uses the one or more decryption keys to perform runtime decryption of one or more files accessed by an entrypoint process of a container associated with the container memory or a descendant of the entrypoint process.

2. The system of claim 1, wherein the one or more types of administrative access to the container memory which are deactivated include one or more of:

administrative access to the container memory through booting from a modified kernel which is modified with respect to a trusted kernel associated with the trusted boot sequence; or administrative access to the container memory through loading additional kernel modules, in addition to kernel modules of the trusted kernel.

3. The system of claim 1, wherein the one or more types of administrative access to the container memory which are deactivated include one or more of:

administrative access to the container memory through one or more virtual memory management devices; or administrative access to the container memory through one or more runtime debugging functions.

4. The system of claim 1, wherein the one or more types of administrative access to the container memory which are deactivated include one or more of:

administrative access to the container memory through pausing a running process to view a memory associated with the running process; or administrative access to the container memory through kernel memory swap operations.

5. The system of claim 1, wherein the trusted boot sequence includes measuring the core service component and storing a resulting core service component measurement in a Trusted Processing Module (TPM) Platform Configuration Register (PCR).

6. The system of claim 1, wherein the core service component securely obtains the one or more decryption keys using a Trusted Processing Module (TPM) remote attestation to a trusted third party service device.

7. The system of claim 1, wherein the runtime decryption component passes through one or more requests for non-encrypted files, and wherein the runtime decryption component checks process identifiers (PIDs) of one or more processes requesting encrypted files to ensure the PIDs belong to the entrypoint process of the container, or a descendant process of the entrypoint process.

8. The system of claim 1, wherein the runtime decryption component uses the one or more decryption keys to decrypt an encrypted container image to instantiate the container.

9. A computer-implemented method comprising:

performing, by a boot component operatively coupled to a processor, at least a portion of a trusted boot sequence to securely boot a computing system to a defined secure state wherein one or more types of administrative access to a container memory are deactivated;

starting, by the boot component, as part of the trusted boot sequence, a core service component operatively coupled to the processor;

securely obtaining, by the core service component, one or more decryption keys for use with the container memory; and using, by a runtime decryption component operatively coupled to the processor, the one or more decryption keys to perform runtime decryption of one or more files accessed by a container associated with the container memory.

10. The computer-implemented method of claim 9, wherein the one or more types of administrative access to the container memory which are deactivated include one or more of:

administrative access to the container memory through booting from a modified kernel which is modified with respect to a trusted kernel associated with the trusted boot sequence; or administrative access to the container memory through loading additional kernel modules, in addition to kernel modules of the trusted kernel.

11. The computer-implemented method of claim 9, wherein the one or more types of administrative access to the container memory which are deactivated include one or more of:

administrative access to the container memory through one or more virtual memory management devices; or administrative access to the container memory through one or more runtime debugging functions.

12. The computer-implemented method of claim 9, wherein the one or more types of administrative access to the container memory which are deactivated include one or more of:

administrative access to the container memory through pausing a running process to view a memory associated with the running process; or administrative access to the container memory through kernel memory swap operations.

13. The computer-implemented method of claim 9, wherein the trusted boot sequence includes measuring the core service component and storing a resulting core service component measurement in a Trusted Processing Module (TPM) Platform Configuration Register (PCR), and wherein the securely obtaining the one or more decryption keys employs TPM remote attestation to a trusted third party service device.

14. The computer-implemented method of claim 9, wherein using, by the runtime decryption component operatively coupled to the processor, the one or more decryption keys to perform runtime decryption of one or more files accessed by a container associated with the container memory comprises:

passing through, by the runtime decryption component, one or more requests for non-encrypted files; and checking, by the runtime decryption component, process identifiers (PIDs) of one or more processes requesting encrypted files to ensure the PIDs belong to an entrypoint process of the container, or a descendant process of the entrypoint process.

15. The computer-implemented method of claim 9, further comprising employing, by the runtime decryption component, the one or more decryption keys to decrypt an encrypted container image to instantiate the container.

16. The computer-implemented method of claim 9, wherein the computer-implemented method enhances security of the container at a container server by securing data associated with the container from the one or more types of administrative access to the container memory during instantiation and runtime of the container at the container server.

17. A computer program product facilitating container security, the computer program product comprising a computer readable storage medium having program instructions embodied therewith, the program instructions executable by a processing component to cause the processing component to:
  perform, by the processing component, at least a portion of a trusted boot sequence to securely boot a computing system to a defined secure state wherein one or more types of administrative access to a container memory are deactivated;
  start, as part of the trusted boot sequence, a core service component;
  securely obtain, by the core service component, one or more decryption keys for use with the container memory; and
  use, by the processing component, the one or more decryption keys to perform runtime decryption of one or more files accessed by a container associated with the container memory.

18. The computer program product of claim 17, wherein the program instructions are further executable by the processing component to cause the processing component to:
  manage one or more file accesses by the container at least in part by passing through one or more requests to access non-encrypted files, and check process identifiers (PIDs) of one or more processes requesting access to encrypted files to ensure the PIDs belong to an entrypoint process of the container or a descendant process of the entrypoint process.

19. A computer-implemented method comprising:
  instantiating, by a system operatively coupled to a processor, one or more containers by a docker component operatively coupled to a processor; and
  for at least one of the one or more containers, managing, by the system, one or more file accesses by the at least one of the one or more containers, wherein a runtime decryption component passes through one or more requests to access non-encrypted files, and wherein the runtime decryption component checks process identifiers (PIDs) of one or more processes requesting access to encrypted files to ensure the PIDs belong to an entrypoint process of the at least one of the one or more containers or a descendant process of the entrypoint process.

20. The computer-implemented method of claim 19, wherein instantiating the one or more containers by the docker component comprises:
  instantiating, by the system, at least one first container daemon component operatively coupled to the processor;
  instantiating, by the system, the runtime decryption component; and
  instantiating, by the system, the at least one of the one or more containers.

21. The computer-implemented method of claim 20, wherein the runtime decryption component employs a filesystem intermediary to check the PIDs of the one or more processes requesting access to encrypted files.

22. A computer-implemented method comprising:
  performing, by a boot component operatively coupled to a processor, at least a portion of a trusted boot sequence to securely boot a computing system, wherein the trusted boot sequence comprises:
    resetting one or more Trusted Processing Module (TPM) Platform Configuration Registers (PCRs); and
    running a series of boot components, wherein each boot component in the series measures a next boot component in the series and stores a corresponding PCR value, wherein at least one of the boot components in the series of boot components comprises a core service component;
  performing, by the core service component operatively coupled to the processor, a TPM remote attestation to a trusted third party service device; and
  securely obtaining, by the core service component, one or more decryption keys for a container from the trusted third party service device, and storing the one or more decryption keys for the container in a container memory associated with the container.

23. The computer-implemented method of claim 22, further comprising managing, by a runtime decryption component operatively coupled to the processor, one or more file accesses by the container, at least in part by checking process identifiers (PIDs) of one or more processes requesting access to encrypted files to ensure the PIDs belong to an entrypoint process of the container or a descendant process of the entrypoint process, wherein the one or more decryption keys are used to decrypt the encrypted files.

24. The computer-implemented method of claim 22, wherein the trusted boot sequence securely boots the computing system to a defined secure state wherein one or more types of administrative access to a container memory are deactivated.

25. The computer-implemented method of claim 24, wherein the one or more types of administrative access to the container memory include one or more of:
  administrative access to the container memory through booting from a modified kernel which is modified with respect to a trusted kernel associated with the trusted boot sequence;
  administrative access to the container memory through loading additional kernel modules, in addition to kernel modules of the trusted kernel;
  administrative access to the container memory through one or more virtual memory management devices;
  administrative access to the container memory through one or more runtime debugging functions;
  administrative access to the container memory through pausing a running process to view a memory associated with the running process; or
  administrative access to the container memory through kernel memory swap operations.

\* \* \* \* \*